Dec. 26, 1967 — W. C. MILLIGAN — 3,359,965
RADIANT HEATERS
Filed Oct. 23, 1965 — 8 Sheets-Sheet 1
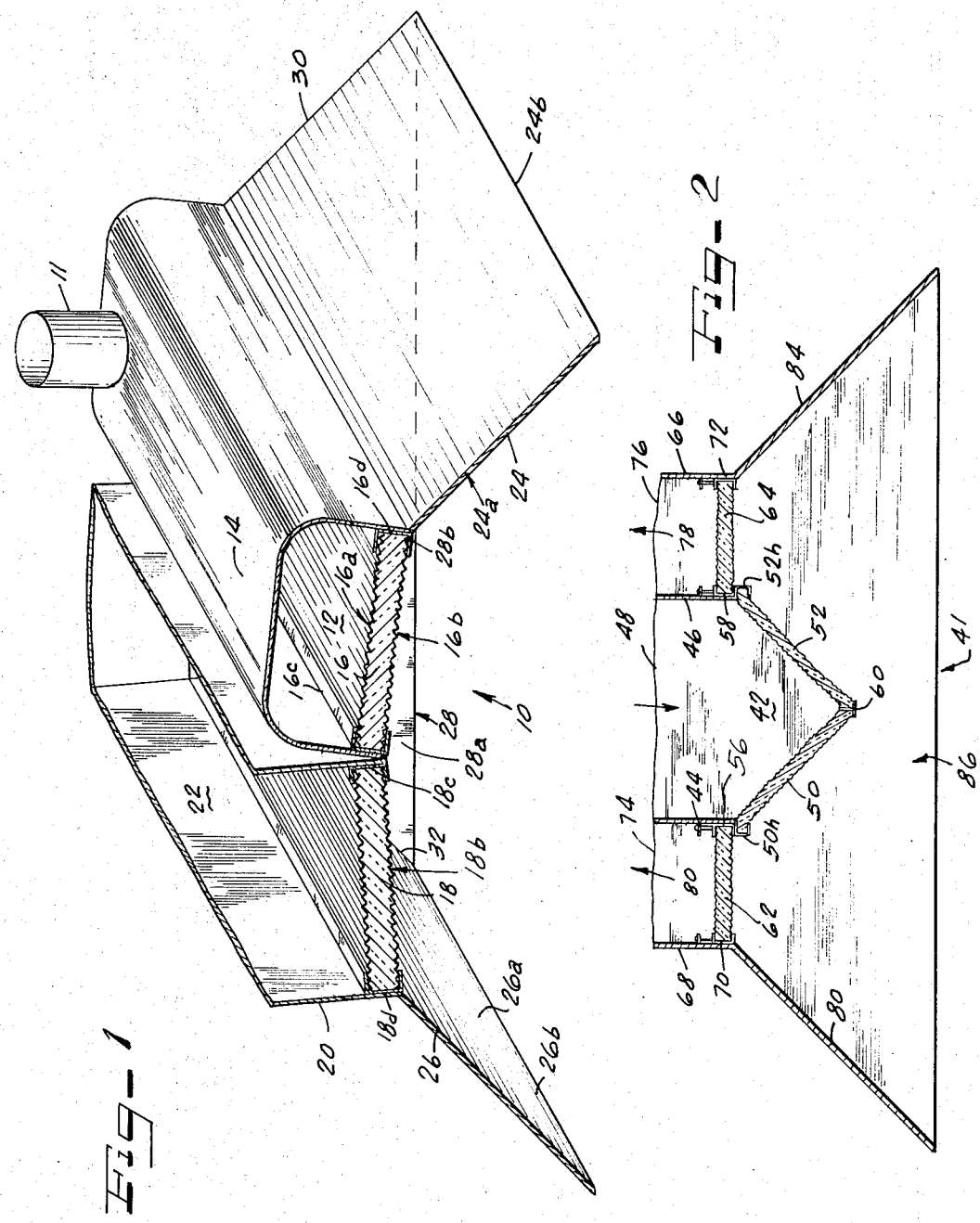
INVENTOR.
WILLIAM C. MILLIGAN
BY *Hill, Sherman, Meroni, Gross & Simpson* ATTORNEYS

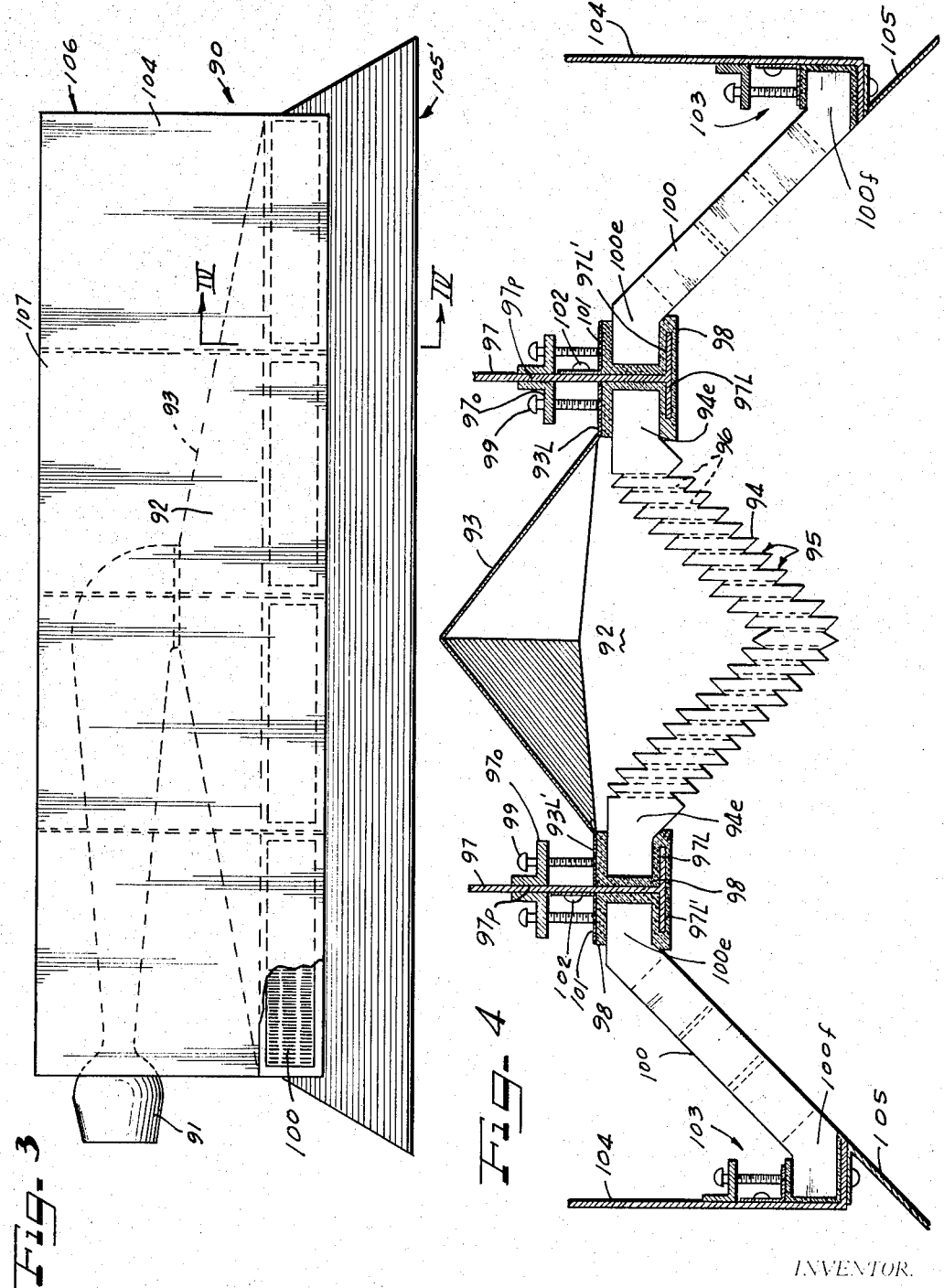

Dec. 26, 1967  W. C. MILLIGAN  3,359,965
RADIANT HEATERS

Filed Oct. 23, 1965  8 Sheets-Sheet 3

INVENTOR.
WILLIAM C. MILLIGAN
BY *Hill, Sherman, Meroni, Gross & Simpson* ATTORNEYS Dec. 26, 1967  W. C. MILLIGAN  3,359,965
RADIANT HEATERS Filed Oct. 23, 1965  8 Sheets-Sheet 5

INVENTOR.
WILLIAM C. MILLIGAN

BY  ATTORNEYS

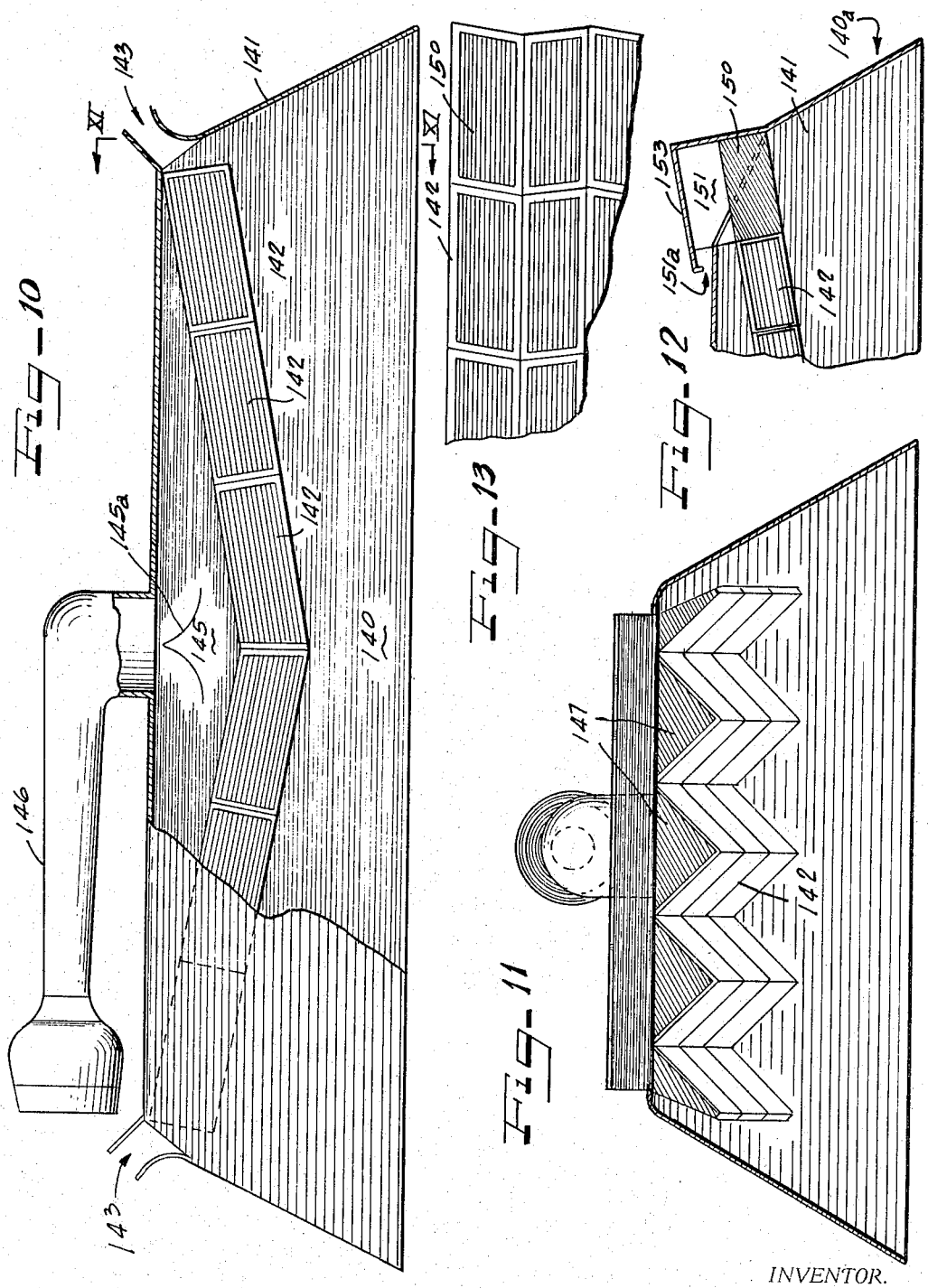

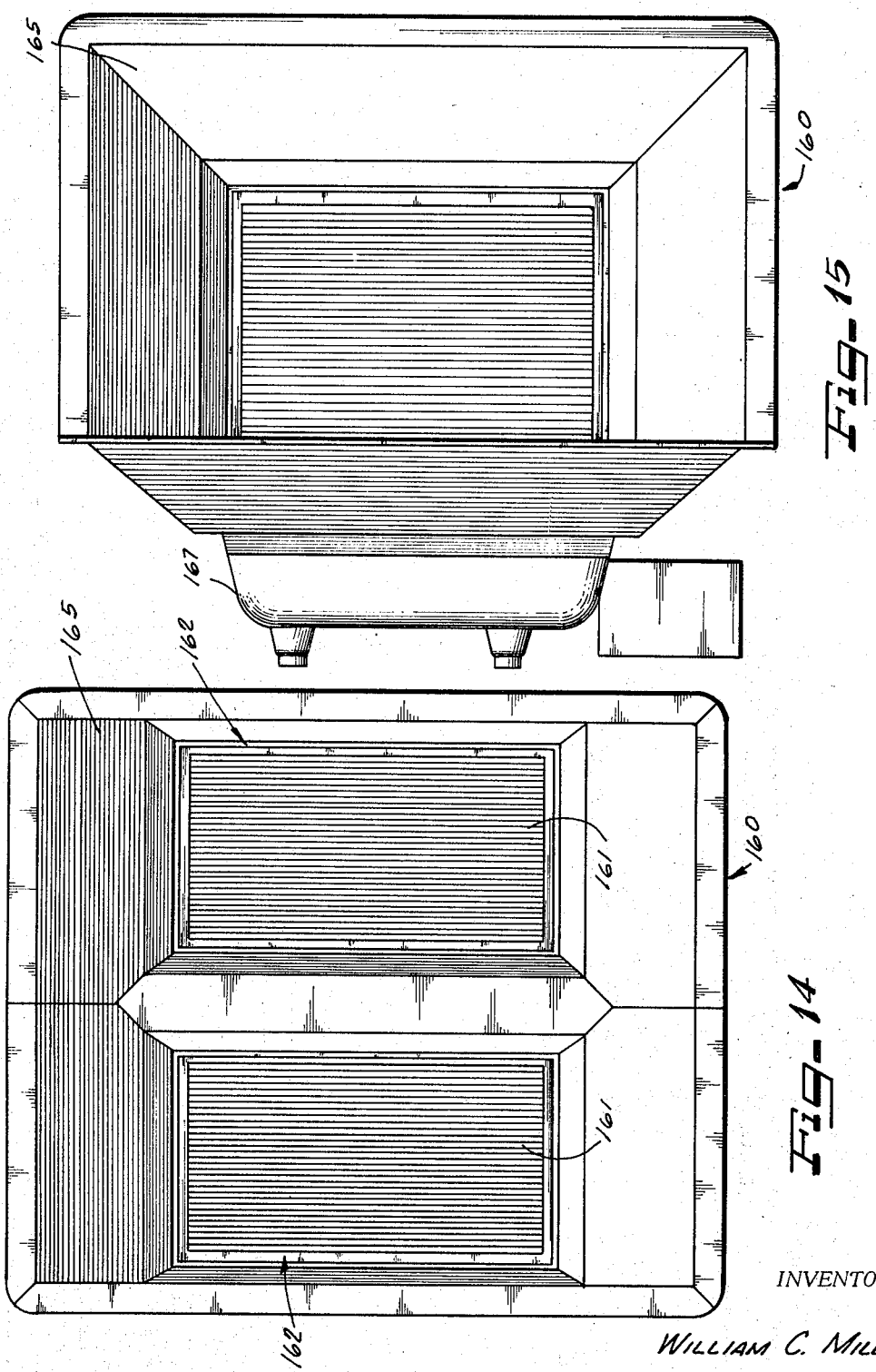

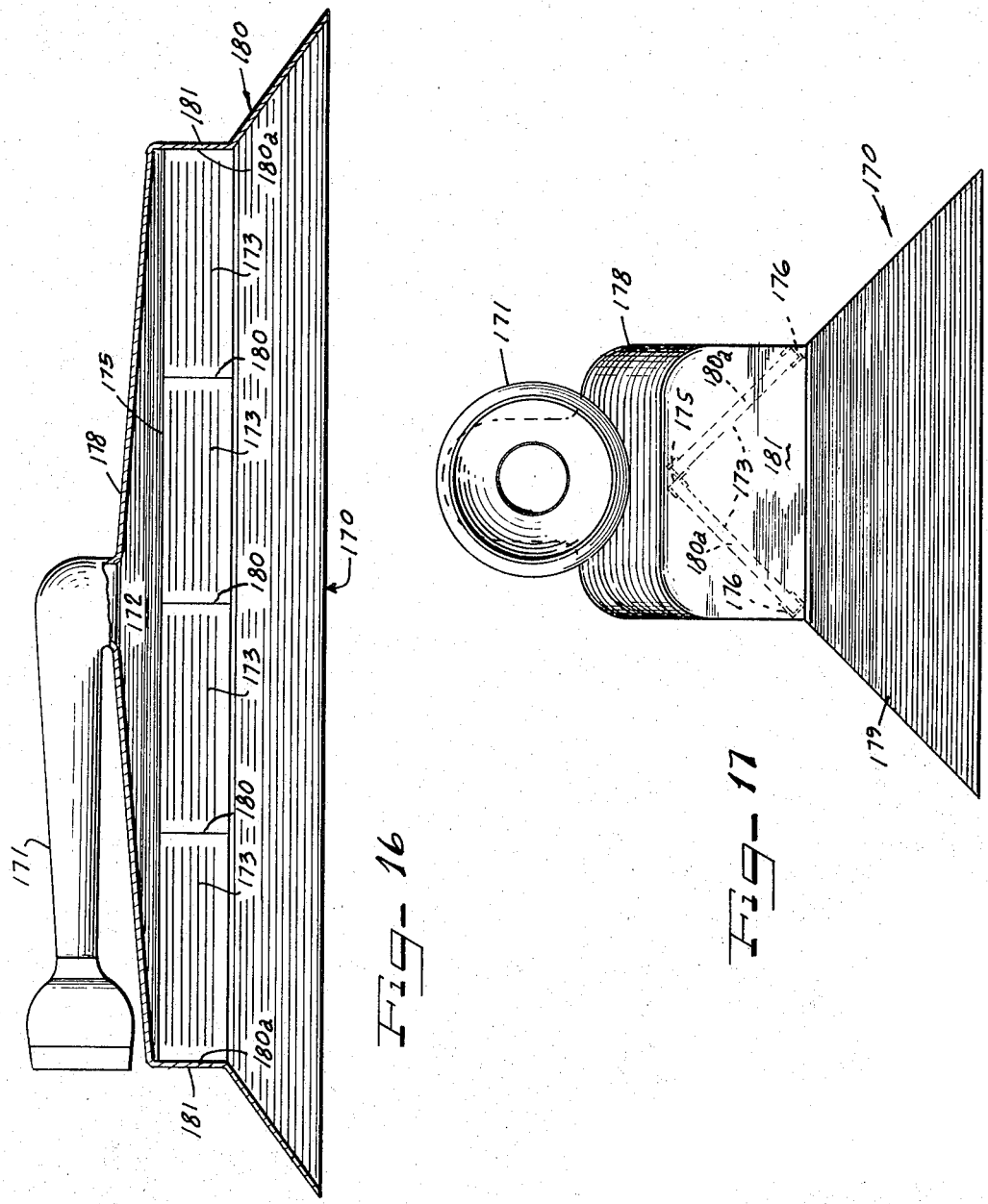

United States Patent Office 3,359,965
Patented Dec. 26, 1967

3,359,965
RADIANT HEATERS
William Cecil Milligan, 1618 San Angelo,
San Antonio, Tex. 78201
Filed Oct. 23, 1965, Ser. No. 503,492
7 Claims. (Cl. 126—92)

ABSTRACT OF THE DISCLOSURE

Gas fired radiant heater including a plurality of porous catalytically active ceramic tiles partly facing each other, with a cowl disposed about one or more of the tiles to provide a plenum chamber into which a gas-air mixture is introduced and wherein one or more porous tile serve as hot gas discharge means to thereby recover heat and radiate the same.

---

This invention pertains to gaseous fueled radiant heaters. It is directed particularly to a novel radiant heater construction having special utility in space heaters such as may be used in heating factories, loading docks and in other places. In these environments of use, due to the large space involved or to exposure to the elements, radiant heating has proved both more effective and more efficient than alternative heating methods. The invention is also applicable to smaller heater units as may be used in the home.

Heretofore, it has not been practical to obtain substantial quantity of radiant energy from the exhaust gases of combustion flames of gaseous fuel heating apparatus in a compact and simple manner. It has been particularly difficult to obtain in such a manner additional radiant energy from exhaust gases of radiant space heaters. This has been true because of the inherent difficulty of handling exhaust gases and also because any supplementary exhaust gas utilizing radiating apparatus must be both extremely compact and extremely efficient in converting radiant energy from the exhaust gases to be economically feasible.

To obtain a high efficiency radiant heater, one expedient that has been used is the placing of metal screens or rods before the radiant burning surface to absorb and reradiate heat back to the burning surface. This type of radiant heater has been handicapped by the relatively high cost of the metal irradiating elements. Furthermore, such metal rods or screens, even when made out of expensive high-temperature metals, have a relatively short service life at operating temperatures above approximately 1500° F. Because of this, radiant burners employing metal construction have not been made for operation at temperatures exceeding 1500° to 1600° F., without having a prohibitively short service life. Also, in known commercial radiant heaters employing only ceramic radiating burning elements, often with combustion catalytic properties, due either to the type of fabrication or to their design or both, these heaters have also had severe temperature limitations. The majority of these non-metallic radiating heaters have not been able to have an operating temperature in excess of 1600° to 1700° F. without excessive danger of "flash-back" and severe flaking or cracking of the ceramic elements, after a number of temperature cycles.

It is a primary object of this invention to provide a new and improved radiant heater.

It is a further object of the invention to provide a radiant heater which achieves an equivalent heat output of, without the requirement for, a supplementary grid for increasing the radiation.

It is another object of the invention to provide a radiant heater of superior design having very high efficiency.

It is a still further object of the invention to provide a radiant heating apparatus which extracts a substantial quantity of extra heat for radiant energy purposes from the exhaust gases.

It is yet another object of the invention to provide means, of simple, compact and inexpensive construction, for extracting substantial quantities of heat from a given quantity of fuel.

It is further a more specific object of the invention to provide a radiant heating apparatus of the space heater type which has exceptionally large total radiant heat surface and which may radiate heat over a substantially wide area.

It is an object of the invention to provide a simple, easily fabricated, and low cost radiant heater which will provide radiant energy for a given fuel input substantially above that obtainable from standard radiant energy heaters.

In accomplishing these objects a gaseous-fueled heater is provided comprising a first gaseously porous ceramic tile having a radiant heat emitting surface and second gaseously porous ceramic tile having a radiant heat emitting surface oriented so as to partially face the heat emitting surface of the first tile. The two surfaces lie in two planes related at an angle to each other. Means are provided comprising a cowl for defining with the opposite surface of at least one of the two tiles, a plenum chamber. Means for supplying a gaseous fuel-air mixture to the plenum are further provided.

Other objects, features and advantages of the present invention will be readily apparent from the claims and the following detailed description of certain embodiments thereof taken in conjunction with the accompanying drawings in which:

FIG. 1 is a perspective view, with parts broken away, of a simplified radiant heater constructed in accordance with the invention and used in explaining some of the features and principles of the invention;

FIG. 2 is an end view of a second radiant heater of a more advanced design embodying the invention;

FIG. 3 is a side view with interior parts in dashed outline and parts broken away, of one preferred radiant heating apparatus embodying the invention;

FIG. 4 is a fragmentary cross-sectional view taken along the line IV—IV in FIG. 3 showing in detail the tile mounting structure according to the principles of the present invention;

FIG. 10 is a side view, partly in section, of another embodiment of the invention;

FIG. 11 is an end view, partly in section, of the heater of FIG. 10, as seen from the line XI—XI in FIG. 10;

FIG. 12 is a partial side view of the heater of FIG. 10 showing an alternative construction of certain parts;

FIG. 13 is a partial bottom plan view of the heater of FIG. 12;

FIG. 14 is a front view of still another embodiment of the invention;

FIG. 15 is a side view of the heater of FIG. 14;

FIG. 16 is a side view, partly in section, of yet another embodiment of the invention; and FIG. 17 is an end view, partly in section of the heater of FIG. 16.

Figure 5:
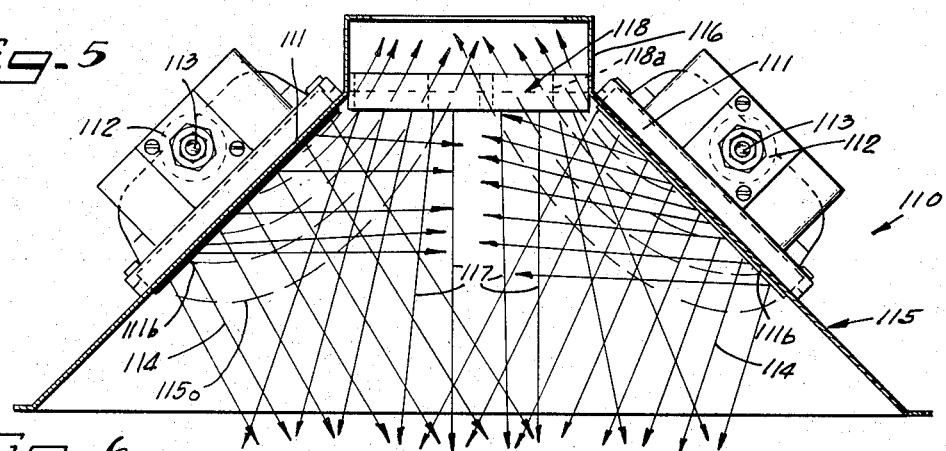
FIG. 5 is a side view, partly in section, of another embodiment of the invention.

Referring now to FIG. 1, there is depicted a simplified gaseous-fueled radiant heater generally indicated by the numeral 10 and constructed in accordance with the present invention. The heater 10 is of the space heater type and has an input duct 11 which opens into a fuel air mixture chamber 12 defined by an inverted U-shaped cowl 14, which forms the air-tight chamber 12 above a generally rectangular porous ceramic firing tile 16. The cowl 14 is preferably made of sheet metal and is joined to the duct 11 and the tile 16 in an air-tight manner to prevent leakage from the chamber 12. The tile 16 is preferably a porous catalytic ceramic construction in accordance with the present inventor's co-pending patent application entitled "Catalytic Heating Unit," Serial No. 431,858, filed February 11, 1965.

It is mounted with means that includes high temperature ceramic batting between the tiles and their areas of support for both absorbing the thermal expansion and providing a proper gaseous seal. The mounting means is described in more detail in conjunction with the heater of FIG. 4. The tile 16 has an input surface 16a facing into the chamber 12 and an opposite radiant heat emitting or firing surface 16b facing away from the chamber 12. The radiant heat emitting surface 16b preferably has a plurality of longitudinal ridges and is rendered porous by means of a plurality of small passages opening into the base of the ridges as is explained in more detail in conjunction with the tile 94 of FIG. 4. In use, the tile 16 is positioned at a slight angle to the horizontal. Adjacent to the slightly angled tile 16 along its higher longitudinal edge 16c is a second generally rectangular porous ceramic tile 18. The tile 18 is also positioned at a slight angle to the horizontal and has its higher longer edge 18c juxtaposed to the edge 16c so that the two tiles are related at a large acute angle to form a shallow upwardly pointed V with its point formed at the junction at one of the edges 16c and 18c. In the particular embodiment depicted, the angle at which the tiles is slanted to the horizontal is approximately equal to 5°. About the edges of the tile 18 is a sheet metal wall 20 rising generally vertically from the tile 18 and defining an exhaust chamber 22. The chamber 22 can be open, as shown, or when conditions demand it, the chamber 22 can be vented into an exhaust duct (not shown) similar to the input duct 11.

Connected to the lower longer sides 16d and 18d of the tiles 16 and 18 are, respectively, reflectors 24 and 26. The reflectors 24, 26 are made of flat sheet metal with polished surfaces 24a and 26a and are in an air-tight junction with the tile and the sheet metal of cowl 14 and wall 20, respectively. Each of the reflectors 24, 26 are of a generally trapezoidal shape with the smaller base adjacent to the tiles. The reflectors are oriented at a steep angle to the horizontal and recede away from the tiles 16 and 18 with their reflective polished surfaces 24a and 26a facing generally downward. A third reflector 28 is affixed to the far end of the tiles 16 and 18 and the end of the cowl 14 in an air-tight manner. The reflector 28, which is of sheet metal and is positioned with a polished surface 28a facing generally downward, depends at an angle away from the tiles 16, 18. The reflector 28 is joined along lines 30 and 32 to the reflectors 24 and 26, respectively, in an air-tight union. A fourth reflector (not shown), similar to the reflector 28, is affixed at the other transverse edge ends of the tiles 16, 18 to form with the reflectors 24, 26 and 28 a shadowbox-type frame opening downward about the tiles 16 and 18. The lower edges 24b, 26b and 28b of the reflectors 24, 26 and 28, as well as the lower edge of the fourth reflector lie in a common horizontal plane below the tiles.

In overall operation, the gas radiant heater described uses flammable gas and air or oxygen and generates radiant heat by combustion, which heat is directed generally downward from the tiles 16 and 18 and the reflectors 24, 26 and 28 in a uniform pattern to the space to be heated.

The gas-air mixture is taken into the chamber 12 from the input duct 11 under pressure. It may either be properly mixed before or the mixing process may take place either entirely or partially in the chamber 12. The designs of a suitable mixing chamber are well known in the art and form no part of the present invention and will, therefore, not be discussed. From the chamber 12, the gas-air mixture passes through the firing tile 16 to the burning surface 16b. At the surface 16b, combustion takes place preferably aided by the catalytic action of the tile 16. Like all gaseous fuel burners, the combustion must be ignited during start-up of the apparatus. Any conventional system, such as a pilot light or manual ignition can be employed.

The hot exhaust gases from the surface 16a of the firing tile 16 are effectively contained within the "shadow box" formed by the reflectors 24, 26 and 28 by their natural tendency to rise. The reflectors 24, 26 and 28, in addition to serving to confine the heated exhaust gases within the "shadow box" help to also confine and serve to reflect the radiant heat from the burning tile 16 and exhaust tile 18 toward the area below desired to be heated. As is conventional, the angle of the reflectors may, within limits, be varied to achieve a range of heating distribution patterns. Exhaust gases are expelled through the tile 18, which of course need not be catalytic since very little if any, combustion occurs at its lower surface 18b. The hot gases passing through the tile 18 heat it to a very high temperature and the tile 18 functions as a second radiator. It has been found that the exhaust gases from the tile 16 have a temperature within approximately 100° to 200° F. of the temperature of the firing surface 16b. Thus, with intertile irradiation, the temperature of the tile 18 has been found to reach approximately that of the tile 16. As the tile 16 may, if constructed in accordance with my above-mentioned co-pending applications, be of considerably higher temperature than previous tiles, it is apparent that the tile 18 approaches, using exhaust gases, the efficiency of previous burning radiating elements. Although in this embodiment the exhaust tile 18 has been shown to be approximately the same size as the input firing tile 16, it could easily be increased in size to gain a greater total radiating surface.

From the tile 18, the spent gases enter the exhaust chamber 22 defined by the wall 20. Using porous tiles of the above-mentioned type it has been found that the pressure difference resulting from the natural tendency of the hot exhaust gases to rise is sufficient to achieve adequate exhausting of the gases. However, if a less porous tile or a smaller exhaust tile surface area is desired, proper exhaust can be achieved by providing means, such as an exhaust fan or pump in conjunction with the chamber 22 to lower the pressure in that chamber and to increase the gaseous flow through the tile 18.

It has been found that the provision of the supplementary tile 18 in applicant's structure has added between 10% to 30% to the total radiant energy output of the radiant heating apparatus to the same fuel input.

Referring now to FIG. 2, there is depicted a second gas fired radiant heating apparatus or heater 41 embodying the invention. In this embodiment a fuel air mixing chamber 42 defined by vertical side walls 44, 46 made of sheet metal, and a pair of end walls, one of which is shown at 48. The end walls are also generally vertical and extend to a V-shaped bottom edge. Also enclosing the chamber 42 are two gaseously porous ridged ceramic firing tiles 50, 52 each of which, like the ceramic tile 16 of FIG. 1 is of a generally rectangular shape. The tiles 50, 52 are positioned adjacent to one another along one longitudinal edge and are each angled at approximately a 45° angle to the horizontal. Each tile 50, 52 has its higher rectangular edge end 50h, 52h joined in an air-tight junction along ends 56, 58 to the bases of walls 44 and 46, respectively. The lower edges of the tiles 52, 54 are joined together, in the manner described more particularly in conjunction with FIG. 4, along the line 60 to form a V in cross-section. Each of the tiles 52, 54 are joined at their shorter transverse edges to the V-shaped edge of the end wall 48 and the opposite disposed end wall in an air-tight seal. Positioned adjacent to the tiles 52 and 54 are exhaust tiles 62 and 64 which may be quite similar to tile 18 of FIG. 1. The exhaust tiles 62, 64 are of generally rectangular shape and are positioned horizontally with one of their respective longer end walls in an air-tight junction at approximately lines 56 and 58. The opposite outwardly disposed longer ends of the tiles 62 and 64 are respectively in an air-tight junction to a pair of side walls 66 and 68 along lines 70 and 72. The side walls 66 and 68 extend vertically upwards from the junction with the tiles 62 and 64 along lines 70 and 72 and define, with the tiles 62, 64 a pair of end walls 74 and 76 and oppositely disposed end walls, an exhaust chamber 78 on the right of the heater 41, and an exhaust chamber 80 on the left of the heater 41. Also joined at approximately lines 70 and 72 are reflectors 82 and 84 which are positioned similarly to the reflectors 24 and 26 in the heater of FIG. 1. A third reflector 86 is positioned and attached as was reflector 28 of FIG. 1. Thus, the reflectors 80, 82 and 84, together with a fourth reflector positioned oppositely to reflector 86 form a generally shadowbox structure facing downward.

In operation a fuel-air mixture introduced into the gas chamber 42 forces gases into and through ridged ceramic elements 52 and 54. The ridged ceramic radiating elements are preferably made and used according to the above-mentioned co-pending patent application. The hot exhaust gases from the radiating elements 52 and 54 are forced to flow over the underneath surfaces of the perforated exhaust gas elements 62 and 64 and pass therethrough and are vented up through the exhaust chambers 78 and 80. The reflectors 80–86 aid the proper distribution of radiant energy over a desired radiating area. When the exhaust gas elements are constructed and used as explained, it has been found that the total radiant energy output from the heating unit will be increased from 10% to 30%, depending on the total exhaust gas radiating area utilized and that resultant temperature over that normally obtainable from radiant heating elements 50 and 52 alone. As pointed out above, these exhaust gas elements will, in general, have burner surface temperatures within 100° to 200° of the surface temperatures of the radiating elements 50 and 52. Although a 90° angle is shown between the tiles 50 and 53, any other desired angle may be used which will give an efficient radiating pattern and which will permit the easy exit and upward flow of exhaust gases away from the burning surfaces of the tiles 50 and 52. This easy outward and upward flow of exhaust gases reduces the back pressure effects of the exhaust gases on the chamber 42 to a relatively low figure, and therefore the production of any excess carbon monoxide, due to reduction in aspirated air from exhaust gas back pressures, may be effectively eliminated. In addition, the upward flow of exhaust gases is efficiently directed toward the exhaust gas elements 62 and 64. Reflectors 82, 84 and 86, in turn, help to funnel the hot gases up to and through the exhaust tiles 62 and 64. The radiating angle of the exhaust gas radiating surfaces 64 and 66 aids substantially in helping to provide a relatively uniform and high intensity radiation pattern obtained from the radiating elements 50 and 52.

The angular placement of the ceramic elements 50 and 52 also provides a substantially large radiating area for a relatively small fuel-air mixture chamber 42. The gas chamber construction is relatively inexpensive and simple since only a flat top and two ends such as the end wall 48 are required to seal the gas chamber since the tiles 50 and 52 form with the side walls 44 and 46 of exhaust chambers 78 and 80.

Referring now to FIG. 3 there is depicted another form of the invention comprising a horizontal longitudinal space heater generally indicated by the numeral 90. The apparatus 90 is equipped with a venturi tube 91 which is horizontally oriented. The tube 91 serves to feed a fuel air mixture into a chamber 92 formed by a cowl 93 which serves to feed to fuel gas air mixture to one or more V-shaped (in cross-section) tiles 94 which extend the horizontal length of the apparatus 90. As may best be seen in FIG. 4, the V-shaped tiles 94 are preferably ridged as at 95 and made porous by a plurality of vertical holes as indicated at 96 which open at the base of the ridges. By base is meant the most interiorly extending portion of the ridge. This construction has the advantage of preventing flash-back of flame back through the tile 94 by having the gaseous fuel first reach the surface at the least irradiated areas. The tiles 94 are secured along their longitudinal edge 94e to a pair of vertical support walls 97 which extend the longitudinal length of the tiles 94. The tiles 94 which are equipped with a rectangular (in cross-section) edge are seated within a mating cavity preferably lined with high temperature ceramic fiber batting 98 which is formed between the edge 94e and a horizontal lip portion 97L formed at the base of the wall 97, and a second horizontal lip portion 93L extending from the cowl 93 above an edge portion 94e of the tile 94. A proper air-tight seal for the chamber 92 as well as structural security and rigidity of support for the tile 94 is obtained by compression means comprising a generally L-shaped outstanding portion 97o affixed at 97p to the wall 97 having a threaded hole for receiving a vertically oriented screw 99. The screw 99 extends from the L-shaped portion 97o to the upper surface of the lip 93L of the cowl 93 and serves to compressively urge the lip 93 against the batting 98 and edge portion 94e of the tile 94 which in turn is urged in sealing contact against the lip portion 97L of the wall 97. In this manner, an effective air-tight seal may be formed between the cowl 93 and the tile 94 which also serves to absorb thermal expansion of the tile 94.

Positioned longitudinally across the apparatus 90 partially facing and adjacent to either side of the tile 95 are a pair of exhaust tiles 100. The tiles 100 are adjacent to the tiles 94 at approximately the lateral edges of the tile 94e and depend downwardly at an angle to the horizontal away from the edge 94e. The tiles 100 are affixed at their upper horizontal edges 100e and are quite similar to that of the edges 94e to the wall 97 by means of a similar horizontal lip portion 97L' extending under the edge portion 100e, the ceramic batting 98 encasing the edge portion 100e and an L-shaped vertically movable compressing member 101 which is affixed at 102 to the wall 97 for vertical motion therealong. It should be noted that ceramic fiber insulation is preferably secured to the lower portions of lips 97L and 97L' to provide protection for the metal of the clip portions and to reduce heat loss through conduction therethrough. The compression member 101 may be adjustably urged against the batting 98 and the edge portion 100e and lip portion 97L' by means of a similar means to that of the L-shaped portion 97o and vertical screws 99. At the lower horizontal edge 100f of the tile 100, a similar sealing and compressing holding mechanism 103 secures the tile 100 to a second pair of walls 104. It should also be noted that the above-described assembly serves the dual function of supporting the ceramic tiles 94 and 100 and cowl 93 and of sealing the various parts from gaseous leakage.

Secured to the walls 104 in a conventional manner are reflectors 105 which form part of a generally shadowbox-shaped reflector 106 which may best be seen in FIG. 3. The tiles 100 have a plurality of generally transverse slot-like openings for allowing exhaust gases to pass therethrough. An exhaust gas duct 106 may be formed by walls 104 and 97 and the tiles 100 extending therebetween.

The wall 97 may be made gaseously porous so as to transfer a quantity of heat to chamber 92 by forming a surrounding chamber defined by an upper surface 107, the opposite walls 104, tiles 100 and cowl 93. With the upper surface 107 between opposite walls 104 enclosed, an exhaust gas chamber is formed around the venturi 91 and chamber 92. With the sheet metal construction for the venturi 91 and cowl 93, significant heat transfer can be achieved between the exhaust gases which have passed through the tiles 100 into this chamber and the entering gas fuel air mixture of the venturi 91 and chamber 92.

In operation the apparatus 90 serves to generate radiant heat in a smooth pattern below the reflector 105'. A gaseous heat fuel and air mixture is fed and mixed in venturi 91 into the chamber 92 from which it passes under pressure through the tile 94. It should be noted that the orientation of the tile 94 cooperates with the angular position of the tiles 100 so as to irradiate radiant energy therebetween. The tile 94 is preferably ridged at 95 so as to pass radiant energy between adjacent ridges of the tile 94. Heated and exhaust gases are captivated within the sealed downwardly directed reflector 105 and pass outwardly through the slot openings of the tile 100. The tile 100, as mentioned before, may achieve a temperature of approximately that of the burning tile 94 and may thus serve to approximately double the radiant energy output of the apparatus 90. The heated gases passing through the tile 100 are then placed into the chamber between adjacent vertical walls 100 from which they may be exhausted in any convenient manner.

Figure 6:
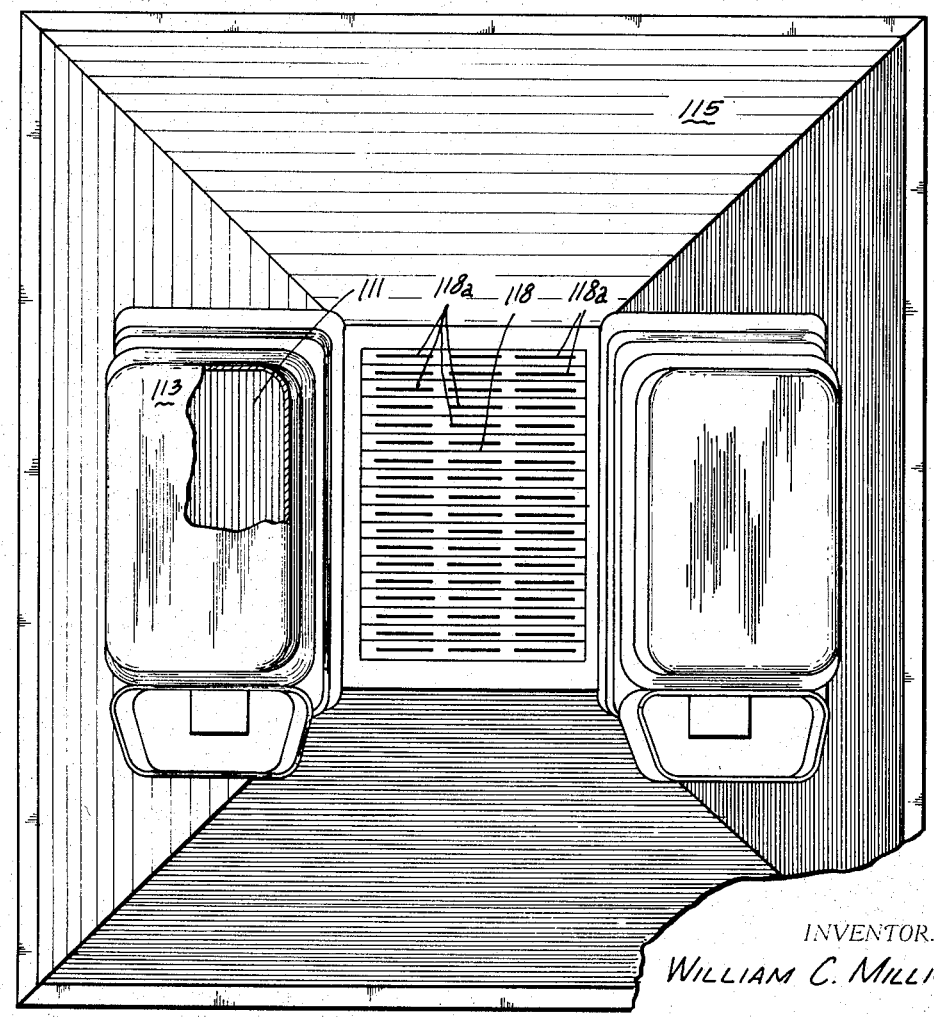
FIG. 6 is a top plan view of the heater of FIG. 5 with parts broken away to show interior construction.

Referring now to FIG. 5 there is depicted another embodiment of the invention. In this case the radiant heating apparatus is a small space heater as may be used in the home or in other environments where the heaters of FIGS. 3 and 4 may provide an excessive output. The heating apparatus of FIG. 5, which is generally indicated by the numeral 110, comprises a pair of oppositely situated heating tiles 111 which are canted at 90° to the horizontal. The tiles 111 each form one surface of a chamber closed by a cowl 112 which has a gas air input 113. The tiles 111 have a burning surface formed of a plurality of longitudinal and horizontal ridges. The cowl 112 is in sealing contact with the outer edges of the generally rectangularly shaped tiles 111 in the general manner as described above in conjunction with FIG. 4, and both the cowls and tiles are secured to a generally shadowbox or picture-frame shaped reflector 115 to form an integral part of the surface thereof. The reflector 115 serves as a funnel for exhaust gases and comprises four depending surfaces (generally trapezoidal), each at 45° to the horizontal, and the tiles 111 form part of oppositely situated surfaces. The heater 110 may be equipped with an exit port 116, for the exhaust gases to escape from the funnel-shaped, picture-frame-shaped reflector 115 formed with the heating tiles 111. The exit port 116 may be equipped, as shown in FIG. 6, with a rectangular-shaped exhaust tile 118 similar in construction to the tile 100 of the apparatus of FIGS. 3 and 4. The tile 118 has its transverse slits 118a oriented normal to the ridges of the tile 111.

In operation, a gaseous fuel mixture is fed to oppositely disposed burning tiles 111 under pressure through the valve entrance 113. From there it passes through the burning surface 111b of the tile 111 where it is burned generating radiation as indicated by lines 114. The burned exhaust gases are drawn, by natural convection, as indicated by the dashed lines 115o, through the exhaust tile 118. The tile 118 which is raised to a temperature approximately that of the tiles 111 by the passage of the exhaust gases and by the inter-tile irradiation, symbolized in FIG. 5 by the arrows 114, so as to radiate downwardly to the space to be heated, as depicted by the arrows 117. The shadowbox-shaped reflector 115 serves as a funnel for the exhaust gases, as the reflector is constructed to have its bounded vertical cross-sectional area decrease in the upward direction from the base of the reflector 115 until the exhaust tile 118.

Figure 7:
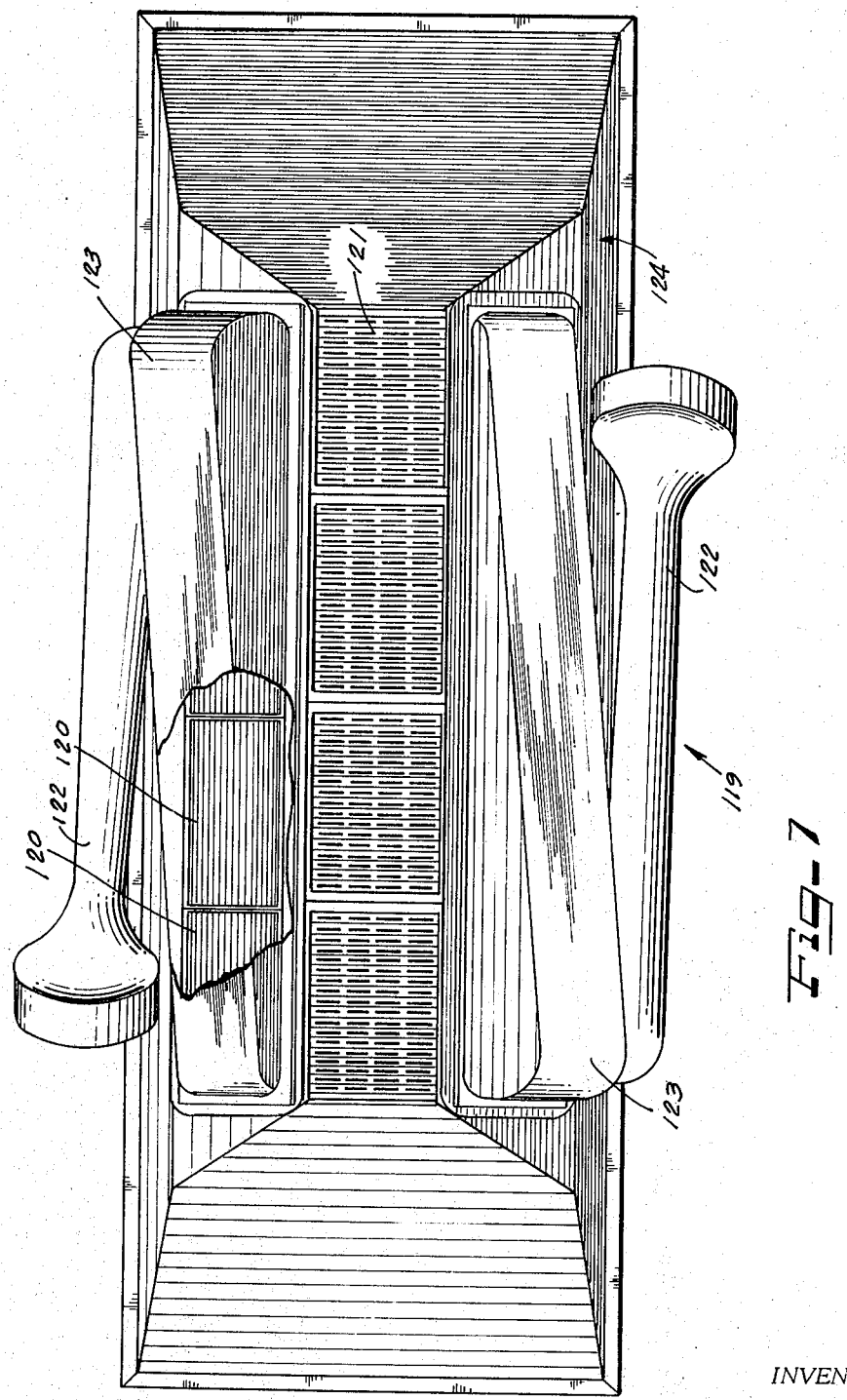
FIG. 7 is a top plan view of another embodiment of the invention with parts broken away to show interior construction.

Referring now to FIG. 7 there is depicted a horizontal gaseous-fueled radiant heater of the type used in heating a large area. This heater which is generally designated by the numeral 119, employs the principle of the above-described smaller FIGS. 5 and 6 radiant heater. The heater 119 uses a series of radiating tiles 100 arranged end to end in two pairs of rows each of which is set at approximately a 45° angle to the horizontal which forms an integral part of the reflector funnel 124.

A venturi tube 122 for feeding the fuel air mixture chamber formed by a cowl 123, extending over the tile 120 on either side of the central exhaust tile 121 serves to feed the mixed fuel and air through the burning tiles 120 through the tube. The shadowbox reflector system, generally indicated by the numeral 124, is positioned about and depends from the tiles 121, 120. In operation, gaseous fuel is fed through each of the venturi tubes 120 from which it enters the fuel air mixing and distributing chamber formed by the cowl 123. From the chamber formed by the cowl 123 the gas passes through the porous tiles 120 to burn at their downwardly facing surfaces. From the burning surfaces, the exhaust gases rise by convection and are captivated within the downwardly facing depending shadowbox-shaped convector 124 which funnels these hot gases through the exhaust tile 121. In this manner, the exhaust tile 121 extracts heat from these gases and serves as an additonal radiating element for the heater 119.

Figure 8:
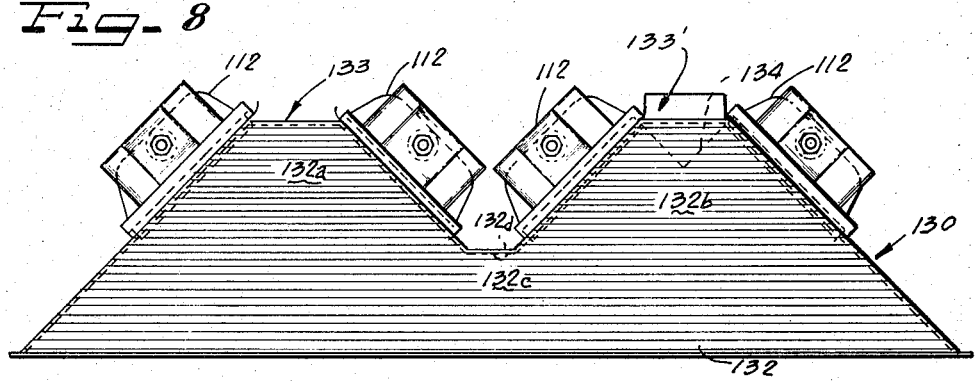
FIG. 8 is a side view of another embodiment of the invention.
Figure 9:
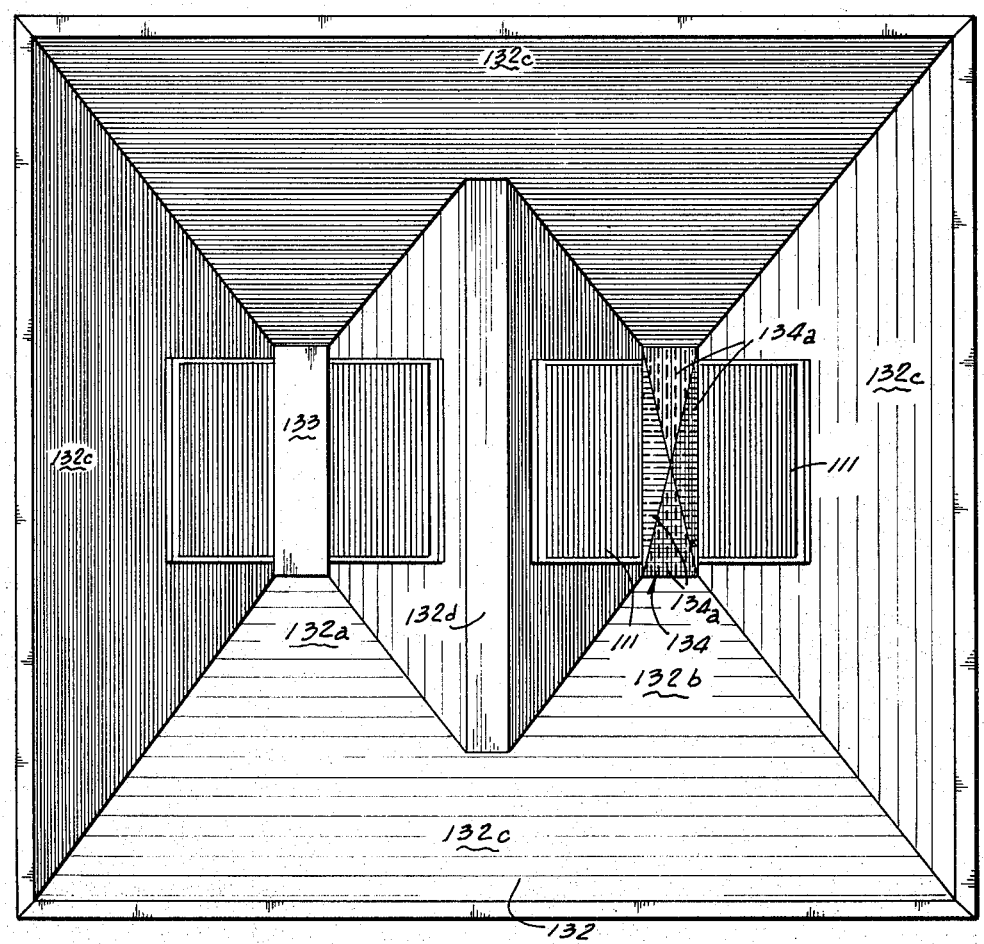
FIG. 9 is a bottom plan view of the heater of FIG. 8.

Referring now to FIG. 8, there is depicted a double unit construction similar to the heating apparatus described in connection with FIGS. 5 and 6. The heating apparatus is generally indicated by the numeral 130 and includes two sets of oppositely disposed plenum chambers each about a burning tile in a manner similar to that of the apparatus of FIGS. 5 and 6. A generally rectangular downwardly and outwardly extending reflector 132 of a general shadowbox-shape which may best be seen in FIG. 9, serves to funnel the hot exhaust gases through exhaust passages generally indicated by the numerals 133 and 133'. The reflector 132 has two sections 132a and 132b about the openings 133 and 133' and further depending common gas funneling portion or skirt 133c which serves to allow co-action between the two units sections 132a and 132b by allowing flow across the junction 132d therebetween. In the case of the exhaust passage 133, no exhaust tile, as depicted in the embodiment of FIGS. 5 and 6, is included. This arrangement is satisfactory for many applications of the apparatus. However, in the case of the exhaust passage 133' an irradiating exhaust tile 134 of unique configuration is included and depends within the chamber area between the heater element 112. As may best be seen in FIG. 9, the exhaust tile 134 comprises a generally rectangular-based and a downwardly oriented pyramid having four triangular-shaped sides 134a. Each triangular side has a plurality of slits, rendering the tile 134 gaseously porous, which slits are formed normal to the base of the triangle. In operation the pyramid-shaped radiation tile serves to reflect and adsorb radiant heat reflected off of the various surfaces of the deflector 132 as well as from the burning tiles 111. The particular embodiment of FIGS. 8 and 9 would not normally be used since preferably both of the passages 133, 133' would have no exhaust tile or would both have an exhaust tile similar to the tile 134, or 118.

Referring now to FIG. 10 there is depicted another embodiment of the invention, in this case a horizontal heater generally indicated by the numeral 140. The heater 140 has a shadowbox-shaped reflector 141 steeply depending away from a plurality of burning heating tiles 142. The apparatus 140 is provided with exhaust openings generally indicated by the numeral 143 at its opposite longitudinal ends. In accordance with a feature of the invention, the apparatus 140 has the heating tiles 142 in V-shaped along the longitudinal axis of the heater as well as in the transverse cross-section. This arrangement has the advantage of allowing the exhaust gases to rise along the length of these tiles in contact with them for transfer of additional heat energy to them. The tiles 142 are supported in their longitudinal shallow V-shape while supported in a number of sharper V's to generate a general sawtooth configuration transversely across the heater (FIG. 11). Individual tiles 142 are preferably constructed as in the previous embodiments, and are supported and sealed with ceramic batting lined structures as previously described in connection with FIG. 4. Behind the tiles 142 is a plenum gas-fuel air mixture chamber generally indicated by the numeral 145 which is sealed from the atmosphere and is fed by a venturi 146. The fuel-air mixture is evenly deflected in the horizontal direction along the longitudinal axis of the heater 140 by means of a deflector 145a positioned within the plenum 145 opposite the opening thereto from venturi 146. The deflector 145a is preferably constructed with apertures to allow part of the flow from tube 146 to pass directly to the tiles 142 positioned opposite to the opening of the venturi 146 into the plenum 145. In the embodiment of FIGS. 10 and 11, the longitudinal ends of the sets of tiles 142 are sealed in a conventional manner at 147.

Referring now to FIG. 12, a variation generally indicated by the numeral 140a of the apparatus 140 is depicted. In this variation a heating exhaust tile 150 is included adjacent and contiguous with each of the last longitudinal end tiles 142 and a metal cowl 153 encases the exhaust gas output surface of the tile 150 to create a chamber 151 thereover. The chamber 51 has an opening 151a which is placed at a relatively low level at the side of cowl 153 facing the venturi 146.

As may best be seen in FIG. 13, the exhaust tiles 150 with their contiguous outer edges abutting against the outer edges of the last burning tiles 142 have a generally V-shaped or sawtooth-shaped (in cross-section) arrangement. In operation, this embodiment of FIGS. 12 and 13 serves to extract additional heat from the spent hot exhaust gases formed by combustion at the tiles 142 and urged through the tiles 150 under convection pressure by the seal reflector 141. The hotter exhaust gases are maintained in proximity and contact with tile 150 for a longer period than otherwise by cowl 153 and opening 151a of chamber 153.

Referring now to FIGS. 14 and 15 there is depicted another embodiment of the invention generally indicated by the numeral 160. In this case, the apparatus 160 is a small space heater-type radiant heating apparatus designed for application and use in a primary vertical oriented position. In this case, the exhaust gases rise vertically across the firing surface 161 of the tiles 162. The apparatus 160 has two adjacent catalytic ceramic burning tiles 162 similar to the burning tiles of the previous embodiments oriented with the ridges running vertically and canted at approximately 90° from each other and includes a reflector generally of shadowbox-shape indicated by the numeral 165 about each of the vertically oriented burning tiles 162. In sealing contact with and about the back of the tiles 162 opposite the burning surface 161 is a gas air mixture containing chamber formed by the individual tiles and on a cowl 167.

In operation the gaseous fuel-air mixture is fed into the chambers defined by the cowls 167 from which it passes through the porous tiles 162 to the burning surface 161 of each individual tile, and is there burned. The resultant exhaust gases rise vertically across the surface 161 of the tiles 162. Radiation is reflected between the burning surfaces 161 as well as in between individual ridges on those surfaces to achieve greater efficiency in the energy output of the apparatus 160.

Referring now to FIGS. 16 and 17 there is depicted a multi-ceramic tile heating tile heater designed for use in a vertical orientation and generally indicated by the numeral 170. The heater 170 comprises eight burning elements or tiles 173 of a generally rectangular shape, stacked transverse edge end upon transverse edge end to form essentially two elongated vertical firing surfaces of four tiles each. The two stacks of tiles 173 are adjacent to and abut against each other along a vertical line 175. They are further oriented to partially face each other in a V configuration with an angular displacement of approximately 90° between the two surfaces. The horizontal individual tile edges 180 are sealed to prevent leakage and the vertical edge along line 175 is likewise sealed. The tiles 173 are constructed as in the previous embodiment and have burning surfaces comprising a multitude of longitudinal ridges extending vertically.

The tiles 173 are mounted in a plenum 172 forming cowl 178 preferably constructed of sheet metal stock. The cowl 178 has horizontal end walls 181 against which the lower and upper vertical edges 180a of the extreme tiles 173 abut in sealing contact. The cowl surface tapers away from the tiles 173 as it recedes from the edges 180a to form a gradually increasing (in vertical cross-section) plenum zone behind the tiles 173, reaching a maximum at the center of the tiles and there opening into a venturi 171. This design is to provide an equal distribution of the fuel-air mixture to the radiating burner elements 173. The venturi 171 is intended to work in conjunction with a conventional gas-air aspirator system (not shown). As best shown in FIG. 17, the heater 10 has its cowl 178 constructed so that it extends beyond the tiles 173 to form a shadowbox-shaped reflector 179 which extends from the non-abutting vertical tile edge lines 176 outwardly to lie in the same plane as the firing surface of the adjacent tiles.

The firing tiles 173 are affixed adjacent one another in a V-shaped configuration so as to allow interchange of radiant energy therebetween. The juncture 145 should preferably have a properly shaped ridge to support the two rolls of tiles 173 at this point and should preferably utilize high-temperature ceramic batting material to aid in providing not only a gas seal but also an expansion joint to allow the ceramic elements to expand and contract during the heating cycles of use. The use of such a joint will prevent gradual deterioration and/or cracking of the ceramic elements which may lead to a damaging explosion. Similar insulation should also be used at the other joints of the tiles 173. The tiles 173 should be of the ridged type, in which case an enlarged radiating surface and greater inter-tile and intra-tile irradiation is obtained. It is important that the ridge be placed lengthwise or vertically as this has been found to greatly increase the effectiveness of the heater 170.

In operation the heater 170 is provided with gaseous fuel from a conventional aspirator system and supplies a gas-air mixture to plenum 172. The plenum chamber 172 functions to supply this gas-air mixture to the input surfaces of the ceramic tiles 173 through which it passes to their burning outer surfaces and is there burned. The orientation of the burning surfaces in a V-shape provides increased radiant energy output. The hot exhaust gases rise along the burning surface of the tiles 173 increasing the radiating efficiency of the device by transferring additional heat energy thereto.

As it is now obvious, a new and improved radiant heater which obviates the necessity of supplementary grids to achieve high energy output and is highly efficient has been described.

It will be apparent that many modifications and variations may be effected without departing from the scope and the novel concepts of the present invention.

I claim as my invention:
1. A gaseous-fueled radiant heater comprising:
   a first and second gaseous porous ceramic tile having
     a burning surface for burning a gaseous fuel;
   means for mounting said first and second tiles adjacent
     to one another at an angle to the horizontal;

means for defining a plenum chamber including the surfaces of said first and second tiles opposite to said burning surface;

a third and fourth gaseous porous ceramic tile each having a radiant heat emitting surface, affixed on opposite sides of said adjacent first and second tiles, said third tile being oriented so as to have its radiant heat emitting surface partially facing said burning surface of said first tile and said fourth tile being oriented so as to have its radiant heat emitting surface partially facing said burning surface of said second tile.

2. The gaseous-fueled radiant heater as claimed in claim 1 in which said tile mounting means includes high temperature ceramic batting between said tiles at the areas of support thereof for absorbing the thermal expansion of said tiles and for providing a proper gaseous seal thereof.

3. The gaseous-fueled radiant heater as claimed in claim 2 in which said tiles are of a generally rectangular configuration and at least one of which is constructed of catalytic ceramic material.

4. The gaseous-fueled radiant heater as claimed in claim 1 in which said first tile is constructed of catalytic ceramic material, formed with a plurality of longitudinally extending ridges.

5. The gaseous-fueled radiant heater as claimed in claim 1 in which said third and fourth tiles serve as exhaust tiles for allowing exhaust gases to pass therethrough and in which a generally shadowbox-shaped reflector is affixed about all of said tiles for captivating and funnelling hot exhaust gases through said third and fourth tiles, said reflector further extending below the lowest point of said tiles.

6. The gaseous-fueled radiant heater as claimed in claim 5 in which said third and fourth tiles are affixed adjacent to the outside horizontal edges of said first and second tiles respectively and lie in a generally horizontal plane.

7. The gaseous-fueled radiant heater as claimed in claim 6 in which said plenum defining means includes a pair of side walls rising generally vertically from respectively the lines of adjacency between said first and third tiles and between said second and fourth tiles and in which means including a pair of walls rising respectively from the edges opposite said lines of adjacency for defining exhaust gas chambers above said third and fourth tiles are provided.

References Cited

UNITED STATES PATENTS

| | | | |
|---|---|---|---|
| 2,895,544 | 7/1959 | Parsons | 158—7.5 |
| 3,103,160 | 9/1963 | Forniti et al. | 126—92 X |
| 3,237,679 | 3/1966 | Best | 126—92 X |
| 3,251,356 | 5/1966 | Prince et al. | 126—92 |
| 3,277,948 | 10/1966 | Best | 158—116 |
| 3,289,665 | 12/1966 | Loeb et al. | 126—92 |
| 3,299,938 | 1/1967 | Bally et al. | 126—92 X |

FOREIGN PATENTS 842,596  7/1960  Great Britain.

FREDERICK KETTERER, *Primary Examiner.*